US008947409B2

(12) United States Patent
Koo

(10) Patent No.: US 8,947,409 B2
(45) Date of Patent: Feb. 3, 2015

(54) DISPLAY PANEL

(75) Inventor: Bon-Yong Koo, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1067 days.

(21) Appl. No.: 12/873,923

(22) Filed: Sep. 1, 2010

(65) Prior Publication Data

US 2011/0141074 A1 Jun. 16, 2011

(30) Foreign Application Priority Data

Dec. 14, 2009 (KR) ........................ 10-2009-0124219

(51) Int. Cl.
*G06F 3/038* (2013.01)
*G09G 5/00* (2006.01)
*G09G 3/36* (2006.01)

(52) U.S. Cl.
CPC ............ *G09G 3/3677* (2013.01); *G09G 3/3648* (2013.01); *G09G 2300/0408* (2013.01); *G09G 2300/0417* (2013.01); *G09G 2300/0426* (2013.01); *G09G 2300/043* (2013.01); *G09G 2320/0223* (2013.01); *G09G 2320/041* (2013.01)
USPC ............... 345/205; 345/208; 345/91; 257/72; 377/78; 349/39

(58) Field of Classification Search
USPC ........................................................ 345/205
See application file for complete search history.

(56) References Cited

U.S. PATENT DOCUMENTS

| | | | | |
|---|---|---|---|---|
| 5,909,262 | A * | 6/1999 | Tomooka et al. | 349/39 |
| 6,600,472 | B1 * | 7/2003 | Nakai et al. | 345/91 |
| 6,845,140 | B2 * | 1/2005 | Moon et al. | 377/78 |
| 7,460,634 | B2 | 12/2008 | Deane | |
| 2003/0169242 | A1 | 9/2003 | Nakanishi | |
| 2004/0119075 | A1 * | 6/2004 | Murade | 257/72 |
| 2004/0119675 | A1 | 6/2004 | Washio et al. | |
| 2006/0104152 | A1 | 5/2006 | Martin et al. | |
| 2008/0100560 | A1 | 5/2008 | Na et al. | |
| 2008/0136756 | A1 | 6/2008 | Yeo et al. | |
| 2008/0218502 | A1 * | 9/2008 | Lee et al. | 345/208 |
| 2010/0134429 | A1 * | 6/2010 | You et al. | 345/173 |

FOREIGN PATENT DOCUMENTS

| | | |
|---|---|---|
| GB | 2341714 | 3/2000 |
| JP | 2002-055644 | 2/2002 |
| JP | 2006-178165 | 7/2006 |
| JP | 2006-309893 | 11/2009 |
| KR | 10-2005-0061131 | 6/2005 |
| KR | 10-0590934 | 6/2006 |
| KR | 10-2007-0118447 | 12/2007 |

(Continued)

OTHER PUBLICATIONS

English Abstract for Publication No. 2002-055644.

(Continued)

*Primary Examiner* — Gerald Johnson
(74) *Attorney, Agent, or Firm* — F. Chau & Associates, LLC

(57) ABSTRACT

A display panel has an amorphous silicon gate driver. A variable capacitor is formed at one end of a gate line to prevent the deterioration of display quality due to high temperature noise. A predetermined level of capacitance is provided to the variable capacitor to the reduce ripple of gate voltage and eliminate the high temperature noise.

29 Claims, 8 Drawing Sheets

(56) References Cited

FOREIGN PATENT DOCUMENTS

| | | |
|---|---|---|
| KR | 10-2007-0118448 | 12/2007 |
| KR | 10-2008-0000205 | 1/2008 |
| KR | 10-2008-0020063 | 3/2008 |
| KR | 10-0826997 | 4/2008 |
| KR | 10-2008-0039026 | 5/2008 |
| WO | WO2006100637 | 9/2006 |

OTHER PUBLICATIONS

English Abstract for Publication No. 10-2005-0061131.
English Abstract for Publication No. 10-0590934.
English Abstract for Publication No. 2006-178165.
English Abstract for Publication No. 2006-309893.
English Abstract for Publication No. 10-2007-0118448.
English Abstract for Publication No. 10-2007-0118447.
English Abstract for Publication No. 10-2008-0000205.
English Abstract for Publication No. 10-2008-0020063.
English Abstract for Publication No. 10-0826997.
English Abstract for Publication No. 10-2008-0039026.
European Search Report dated Mar. 24, 2011 for Application No. 10010671.5-2205.

* cited by examiner

DISPLAY PANEL

CROSS-REFERENCE TO RELATED APPLICATION

This application claims priority to and the benefit of Korean Patent Application No. 10-2009-0124219 filed in the Korean Intellectual Property Office on Dec. 14, 2009, the entire content of which is incorporated by reference herein.

BACKGROUND (a) Technical Field

The present disclosure relates to display panels and in particular, to a display panel that has a gate driver integrated in the display panel.

(b) Discussion of the Related Art

Among display panels, the liquid crystal display is one of the flat panel displays that are currently widely used and includes two display panels in which field generating electrodes, such as a pixel electrode and a common electrode, are formed with a liquid crystal layer disposed therebetween. The liquid crystal display has voltages applied to the field generating electrodes to generate an electric field in the liquid crystal layer, such that the direction of liquid crystal molecules of the liquid crystal layer is determined and polarization of incident light is controlled, thereby displaying images. Display panels also include organic light emitting devices, plasma display devices, and electrophoretic displays.

Each display device typically includes a gate driver and a data driver. The gate driver is typically patterned along with gate lines, data lines, and thin film transistors, to be able to be integrated on the panel. The integrated gate driver does not need a separate gate driving chip, thereby making it possible to reduce manufacturing costs. However, the characteristics of a semiconductor (in particular, an amorphous semiconductor) of thin film transistors implemented in integrated gate drivers can change as a function of temperature. As a result, the gate voltage output at high temperature does not have a predetermined waveform and thus, noise can occur.

SUMMARY

According to an exemplary embodiment a display panel has an amorphous silicon gate driver. A variable capacitor is formed at one end of a gate line to prevent the deterioration of display quality due to high temperature noise. A predetermined level of capacitance is provided to the variable capacitor to reduce the ripple of gate voltage and eliminate high temperature noise.

According to an exemplary embodiment of the present invention a display panel includes a display area that includes a gate line. A main gate driver integrated on a substrate is connected to one end of the gate line and applies a gate on voltage to the gate line.

The variable capacitor may be connected to an other end of the gate line

One end of the variable capacitor may be connected to the gate line and the other end thereof may be connected to receive voltage from the outside.

The variable capacitor may have capacitance that varies according to the voltage applied to the other end of the variable capacitor.

When more than two variable capacitors are included, the variable capacitors may be connected in parallel.

The display area may further include a data line that intersects the gate line.

One electrode of the variable capacitor may be made of the same material as the gate line, The other electrode of the variable capacitor may be made of the same material as the data line.

A gate insulating layer may cover the gate line and be between the one electrode of the variable capacitor and the other electrode of the variable capacitor.

The sub gate driver may further include a gate voltage discharge transistor that discharges the voltage applied to the gate line.

The gate voltage discharge transistor may further include a control electrode connected to a gate line of a next stage, an input electrode connected to a gate line of a current stage, and an output electrode connected to low voltage.

The main gate driver may include a thin film transistor of amorphous silicon.

The main gate driver may include an input unit, a pull-up driver, a transmit signal generator, an output unit, and a pull-down driver.

The input unit may be responsive to an input voltage and have an output connected to the transfer signal generator, to the pull-down driver and to the output unit.

The pull-up driver may be responsive to clock signals and have an output connected to the pull-down driver.

The transfer signal generator may be responsive to the clock signals and have an output connected to a next stage for outputting a transfer signal to the next stage.

The output unit may be connected to the gate line for providing a gate on voltage and a gate off voltage to the gate line.

The pull-down driver may be responsive to a gate voltage of the next stage for changing a gate on voltage output from the output unit to a gate off voltage.

According to an exemplary embodiment of the present invention, when noise occurs in the gate voltage at high temperature, the capacitance having a predetermined size may be provided to the variable capacitor such that the size of the capacitance in the gate line is increased and a ripple occurring in the gate voltage is reduced, thereby removing noise occurring at high temperature. However, one terminal of the variable capacitor may be floated to remove the capacitance provided in the variable capacitor, thereby making it possible to control the capacitance in the gate line as needed.

DETAILED DESCRIPTION OF THE EMBODIMENTS

Figure 1:
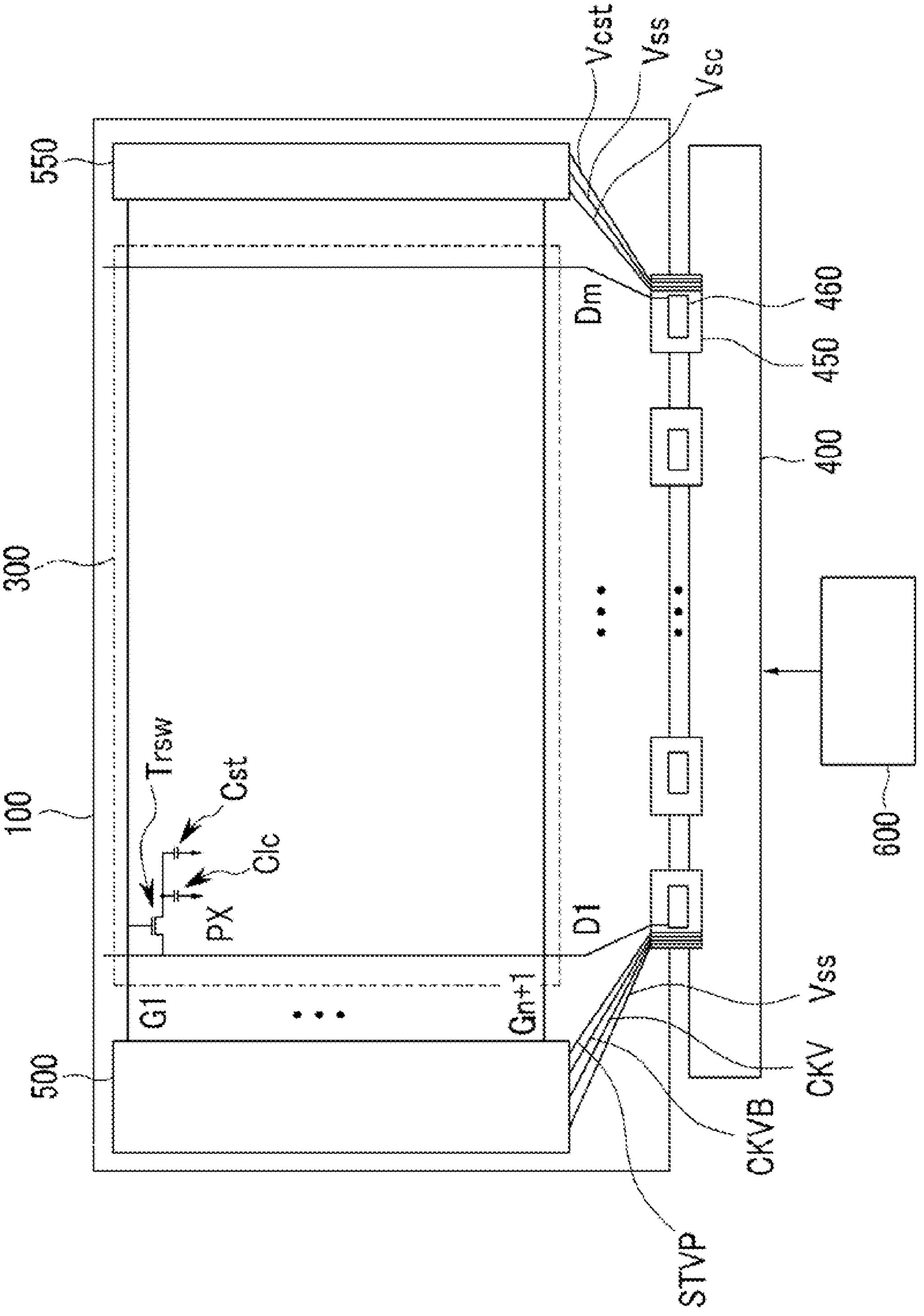
FIG. 1 is a plan view of a display panel according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

FIG. 1 is a plan view of a display panel according to an exemplary embodiment of the present invention. A display panel 100 includes a display area 300 that displays images and a gate driver (including a main gate driver 500 and a sub gate driver 550) that applies gate voltages to the gate lines of the display area 300. The data lines of the display area 300 are applied with data voltages from a driver IC 460 that is formed on a flexible printed circuit film (FPC) 450 attached to the display panel 100. The gate drivers 500, 550 and the data driver IC 460 are controlled by a signal controller 600. A printed circuit board (PCB) 400 is formed at an outer side of the flexible printed circuit film 450 to transmit signals from the signal controller 600 to the data driver IC 460 and to the gate driers 500, 550. The signal controller 600 provides a first clock signal CKV, a second clock signal CKVB, a scan starting signal STVP, and signals that provide specific voltages Vss, Vcst, Vsc.

The display area 300 of FIG. 1 for a representative liquid crystal panel includes a plurality of thin film transistors Trsw, liquid crystal capacitors Clc, and maintaining capacitors Cst. A representative organic light emitting panel includes a plurality of thin film transistors and organic light emitting diodes. Other representative display panels include elements such as a thin film transistors and the like, thereby forming the display area 300. Hereinafter, an exemplary embodiment for a liquid crystal panel implementation will be described in more detail.

The display area 300 includes a plurality of gate lines G1, . . . Gn+1 and a plurality of data lines D1, . . . Dm, wherein the plurality of gate lines G1, . . . Gn+1 and the plurality of data line D1, . . . Dm are isolated from, but intersect with, each other.

Each pixel PX includes the thin film transistor Trsw, the liquid crystal capacitor Clc, and the maintaining capacitor Cst. A control terminal of the thin film transistor Trsw is connected to one gate line. An input terminal of the thin film transistor Trsw is connected to one data line. An output terminal of the thin film transistor Trsw is connected to one terminal of the liquid crystal capacitor Clc and one terminal of the maintaining capacitor Cst. The other terminal of the liquid crystal capacitor Clc is connected to a common electrode and the other terminal of the maintaining capacitor Cst is applied with a maintaining voltage Vcst from the signal controller 600.

Data voltages from the data driver IC 460 are applied to the plurality of data lines D1, . . . Dm and gate voltages from the gate drivers 500, 550 are applied to the plurality of gate lines G1, . . . Gn+1.

The data driver IC 460 is formed on the upper and lower sides of the display panel 100 and is connected to the data lines D1, . . . Dm that extend in a vertical direction and the exemplary embodiment of FIG. 1 shows the case where the data driver IC 460 is disposed at the lower side of the display panel 100.

The gate drivers 500, 550 include the main gate driver 500 that applies the gate voltage to the gate lines G1, . . . Gn+1 and the sub gate driver 550 that provides additional storage capacitance to the gate lines G1, . . . Gn+1 or discharges the applied gate voltage.

The main gate driver 500 receives clock signals CKV, CKVB, scan starting signal STVP, and the low voltage Vss to generate gate voltages (gate-on and gate-off voltages) and sequentially applies the gate-on voltage to the gate lines G1, . . . Gn+1.

The sub gate driver 550 performs (through a gate voltage discharge transistor Tr14 shown in FIG. 2) the role of lowering the gate-on voltage, which is applied to a gate line of the current stage, to the low voltage Vss (the gate-off voltage) when the gate on voltage is applied to the gate on voltage of the next stage and provides additional capacitance through the variable capacitor Csc (shown in FIG. 2) to reduce the ripple in the gate voltage, thereby performing the role of removing noise occurring at high temperature. The capacitance of the variable capacitor Csc can vary according the voltage value that is applied to one end of the variable capacitor Csc and one end can float, such that the variable capacitor would not perform the role as a capacitor.

The sub gate driver 550 is applied with the maintaining voltage Vcst that is applied to one end of the maintaining capacitor Cst in each pixel PX to maintain the applied data voltage for one frame.

The clock signals CKV, CKVB, the scan starting signal STVP, and the voltage Vss (the gate-off voltage), and the maintaining voltage Vcst that are applied to the main gate driver 500 and the sub gate driver 550 are applied to each gate driver 500, 550 through two flexible printed circuit films 450 that is positioned at the outermost side of the display panel 100. The signal is transmitted to the flexible printed circuit films 450 through the printed circuit board 400 from the signal controller 600.

The gate drivers 500, 550 and the gate lines G1, . . . Gn+1 will now described in more detail.

Figure 2:
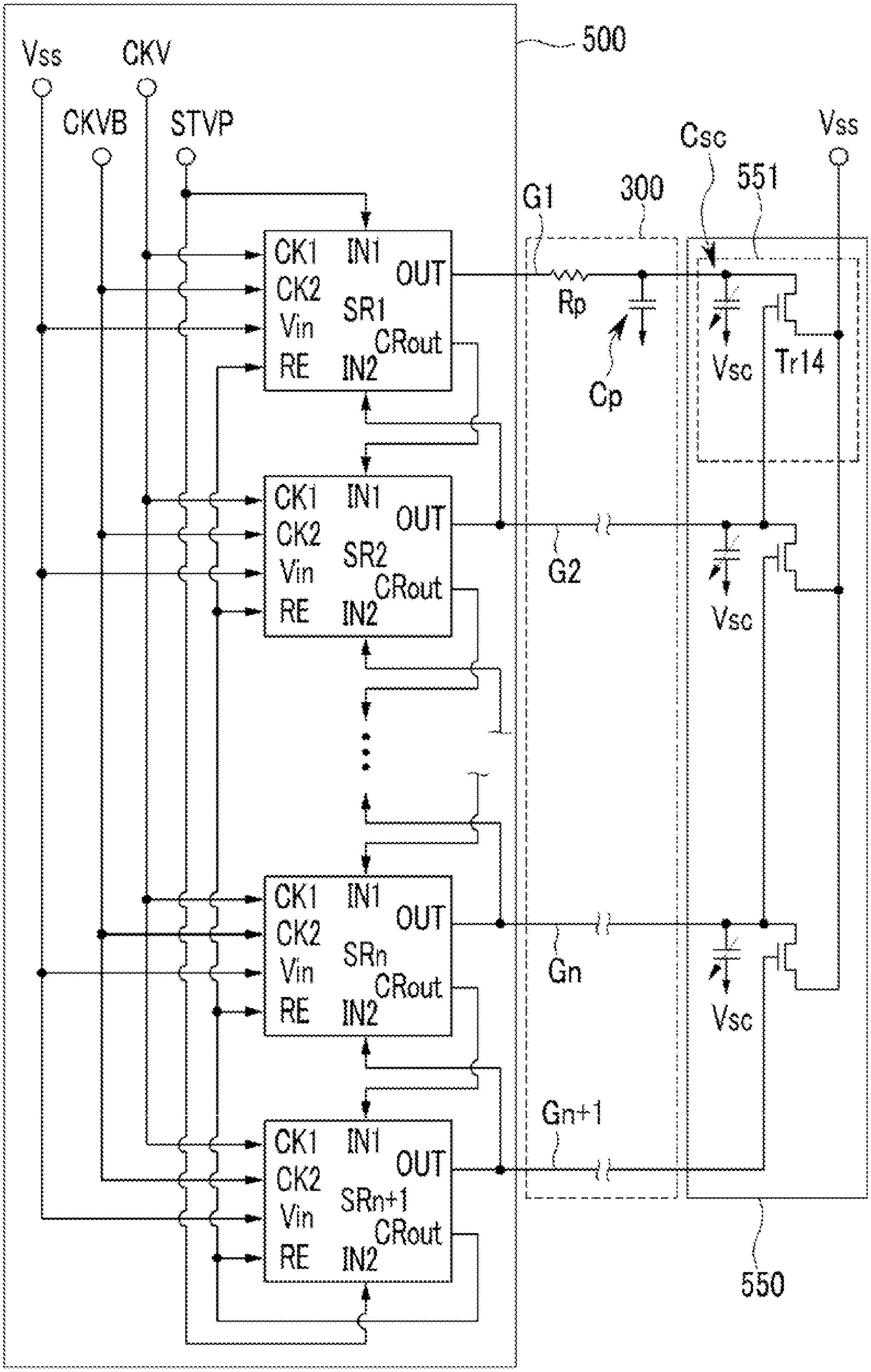
FIG. 2 is a block diagram showing in more detail the gate driver and the gate lines shown in FIG. 1.

FIG. 2 is a block diagram showing in more detail the gate driver 500, the sub gate driver 550 and the gate lines G1, . . . Gn+1 shown in FIG. 1. The main gate driver 500 includes plurality of stages SR1, SR2, . . . SRn, SRn+1 that are connected to each other in a cascade form. Each stage SR1 SR2, . . . SRn, SRn+1 includes two input terminals IN1, IN2, two clock input terminals CK1, CK2, a voltage input terminal Vin that is applied with the low voltage Vss, a reset terminal RE, an output terminal OUT, and a transfer signal output terminal CRout.

The first input terminal IN1 is connected to the transfer signal output terminal CRout of a previous stage to receive the transfer signal CR of the previous stage. The first stage receives the scan starting signal STVP to a first input terminal IN1 since there is no previous stage.

The second input terminal IN2 is connected to the output terminal OUT of the next stage to receive the gate voltage of the next stage. Herein, in the case of an n+1-th stage SRn+1 (dummy stage) that is formed last, it is applied with the scan starting signal STVP to a second input terminal IN2 since there is no next stage.

The first clock terminals CK1 of odd numbered stages of the plurality of stages are applied with the first clock CKV and the second clock terminal CK2 is applied with the second clock CKVB having an inverted phase. The first clock terminal CK1 of even numbered stages is applied with the second clock CKVB and the second clock terminal CK2 thereof is applied with the first clock CKV, such that the phase of the clock input to the same terminal is opposite to each other, as compared with the odd numbered stage.

The voltage input terminal Vin is applied with the low voltage Vss as the gate-off voltage and the reset terminal (RE) is connected to the transfer signal output terminal CRout of the dummy stage SRn+1 that is positioned last.

The dummy stage SRn+1 is a stage that generates and outputs the dummy gate voltage unlike other stages SR1, SR2, . . . SRn. In other words, the gate voltages output from other stages SR1, SR2, . . . SRn are transferred through the gate line and the data voltage is applied to the pixel to display the images. However, the dummy stage SRn+1, even though it is connected to a gate line, may be connected to the gate line of a dummy pixel (not shown) that does not display the images image, such that it is not used to display images.

The operation of the main gate driver 500 will now be described in more detail.

First, the first stage SR1 is applied with the first and second clock signals CKV, CKVB through the first clock input terminal CK1 and the second clock input terminal CK2 from the outside and the scan starting signal STVP through the first input terminal IN1. The voltage input terminal Vin is applied with the low voltage Vss for the gate-off voltage, and receives the gate voltage (voltage output from an out terminal) provided from the second stage SR2 through the second input terminal IN2, respectively, to output the gate voltage to the first gate line through the output terminal OUT. The transfer signal output terminal CRout outputs the transfer signal CR, which is transferred to the first input terminal IN1 of the second stage SR2.

The second stage SR2 is applied with the first and second clock signals CKV, CKVB provided through the first and second clock input terminals CK1, CK2 from the outside, respectively, and the transfer signal CR of the first stage SR1 through the first input terminal IN1. The voltage input terminal Vin is applied with the voltage Vss, and receives the gate voltage provided from the third stage SR3 through the second input terminal IN2, respectively, to output the gate voltage of the second gate line through the output terminal OUT. The transfer signal output terminal CRout outputs the transfer signal CR, which is transferred to the first input terminal IN1 of the third stage SR3.

In the above-mentioned manner, the n stage SRn is applied with the first and second clock signals CKV, CKVB provided from the outside through the first and second clock input terminals CK1, CK2, respectively, and the transfer signal CR of the n−1 stage SRn−1 through the first input terminal IN1. The voltage input terminal Vin is applied with the voltage Vss, and receives the gate voltage provided from the n−1 stage SRn−1 through the second input terminal IN2, respectively, to output the gate voltage of the n-th gate line through the output terminal OUT. The transfer signal output terminal CRout outputs the transfer signal CR, which is transferred to the first input terminal IN1 of the n+1 dummy stage SRn+1.

The sub gate driver 550 includes the unit sub gate driver 551 corresponding to one gate line of the gate lines G1, . . . Gn+1.

One unit sub gate driver 551 includes at least one variable capacitor Csc and at least one gate voltage discharge transistor T14.

One-to-one correspondence may be shown to exist between the gate voltage discharge transistor T14 and one gate line and a plurality of variable capacitors Csc, or only one variable capacitor, may be formed in one gate line according to the size of the required capacitance. The exemplary embodiment of FIGS. 5 to 8 is formed with two variable capacitors Csc.

Figure 3:
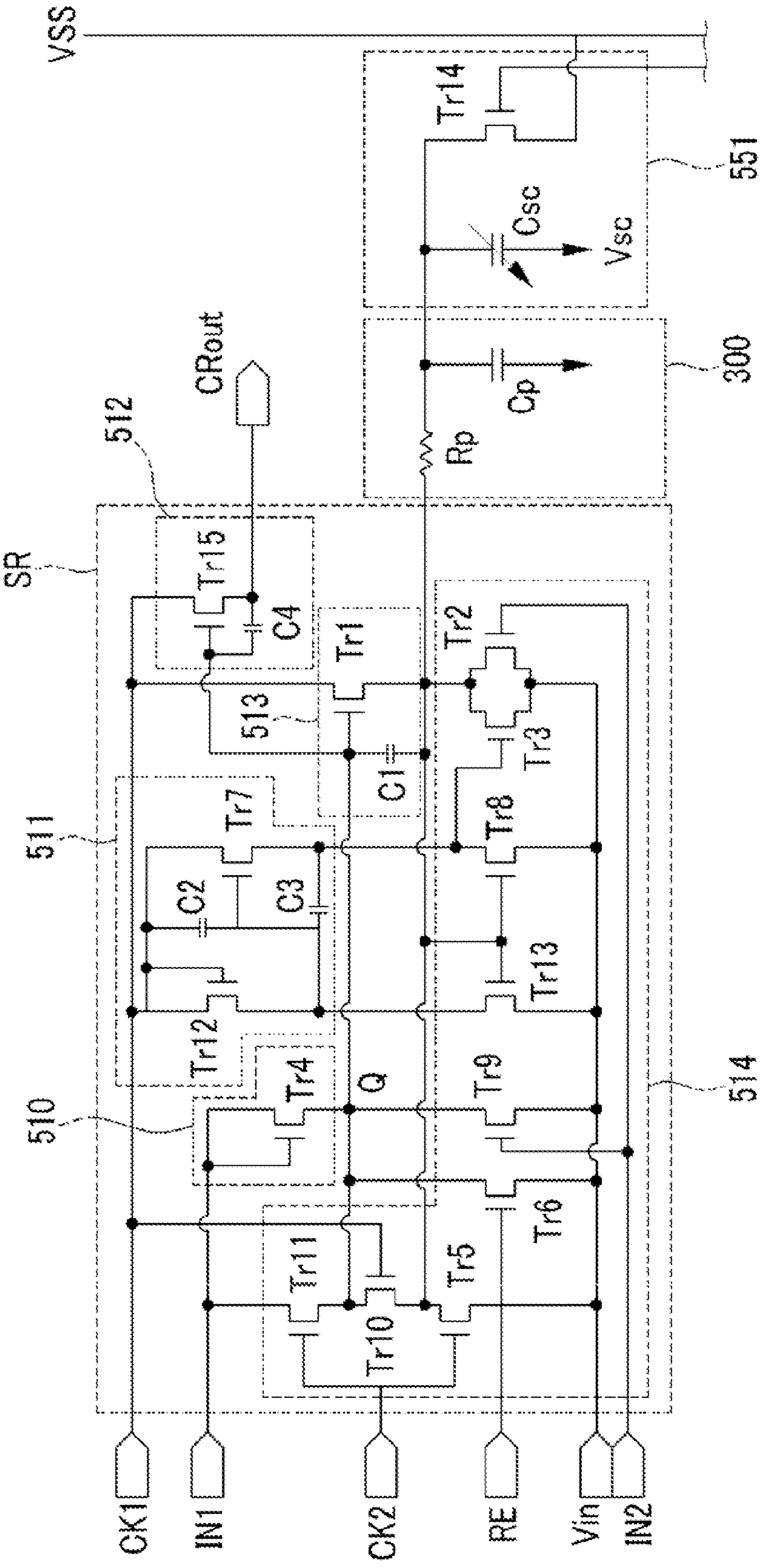
FIG. 3 is a circuit diagram showing one stage, one gate line, one variable capacitor, and one gate voltage discharge transistor of the exemplary embodiment shown in FIG. 2.

As seen in FIG. 3, one end of the variable capacitor Csc is connected to the gate line and the other end thereof is connected to the variable capacitor voltage Vsc that is applied to the variable capacitor Csc. The variable capacitor Csc may have the capacitance changed according to the variable capacitor voltage Vsc and when the variable capacitor Csc is unnecessary, the end of the variable capacitor is disconnected from a portion that applies the voltage Vsc to float the end of the variable capacitor Csc, thereby, in essence, removing the variable capacitor Csc.

The gate voltage discharge transistor Tr14 includes the input terminal that is connected to the gate line of the current stage, a control terminal that is connected to the gate line of the next stage, and an output terminal that is applied with the low voltage Vss. In other words, when the gate-on voltage is applied to the gate line of the next stage, the voltage that is applied to the gate line of the current stage is discharged, thereby having the Vss voltage value that is the low voltage. As a result, even after the gate-off voltage is applied, the charge remaining in the gate line is removed, thereby making it possible to prevent the malfunction of the thin film transistor Trsw.

The structure of the gate driver that is connected to one gate line will be described in more detail with reference to FIG. 3 which is a circuit diagram showing one stage (SR), one gate line, and one unit sub gate driver 551 of FIG. 2.

First, the structure of one stage SR will be described.

Referring to FIG. 3, each stage SR of the main gate driver 500 according to the present exemplary embodiment includes an input unit 510, a pull-up driver 511, a transfer signal generator 512, an output unit 513, and a pull-down driver 514.

The input unit 510 includes fourth transistor Tr4. The input terminal and control terminal of the fourth transistor Tr4 is commonly connected (diode-connected) to the first input terminal IN1, and the output terminal is connected to a Q contact. When the input unit 510 applies the high voltage to the first input terminal IN1, the input unit 510 performs a role of transferring the high voltage to the Q contact.

The pull-up driver 511 includes seventh transistor Tr7, twelfth transistor Tr12, second capacitor C2, and third capacitor C3. The input electrode is commonly connected to the control electrode of the twelfth transistor Tr12 such that it receives the first clock signal CKV or the second clock signal CKVB through the first clock terminal CK1 and the output electrode is connected to the pull-down driver 514. The input electrode of the seventh transistor Tr7 receives the first clock signal CKV or the second clock signal CKVB through the first clock terminal CK1. The control terminal and the output terminal of the seventh transistor Tr7 is connected to the pull-down driver 514. The second capacitor C2 is connected between the input electrode and the control electrode of the seventh transistor Tr7 and the third capacitor C3 is connected between the control electrode and the output electrode of the seventh transistor Tr7.

The transfer signal generator 512 includes fifteenth transistor Tr15 and fourth capacitor C4. The input electrode of the fifteenth transistor Tr15 receives the first clock signal CKV or the second clock signal CKVB through the first clock terminal CK1 and the control electrode is connected to the output of the input unit 510. That is, the Q contact and the control electrode and the output electrode are connected to the fourth capacitor C4. The transfer signal generator 512 outputs the transfer signal CR according to the voltage at the Q contact and the first clock signal CKV.

The output unit 513 includes first transistor Tr1 and first capacitor C1. The control electrode of the first transistor Tr1 is connected to the Q contact. The input electrode receives the first clock signal CKV or the second clock signal CKVB through the first clock terminal CK1. The control electrode and the output electrode are connected to the first capacitor C1 and the output terminal is connected to the gate line. The output unit 513 outputs the gate voltage according to the voltage at the Q contact and the first clock signal CKV.

The pull-down driver 514 removes the charge existing on the stage SR to smoothly output the gate-off voltage Q thereby lowering the potential of the gate line contact and lowering the voltage output to the gate line. The pull-down driver 514 includes second transistor Tr2, third transistor Tr3, fifth transistor Tr5, sixth transistor Tr6, eighth transistor Tr8, ninth transistor Tr9, tenth transistor Tr10, eleventh transistor Tr11, and thirteenth transistor Tr13.

The fifth transistor Tr5, the tenth transistor Tr10, and the eleventh transistor Tr11 are coupled in series between the first input terminal IN1 that is applied with the transfer signal CR of the previous stage SR and the voltage input terminal Vin that is applied with the low voltage Vss. The control terminals of the fifth and eleventh transistor Tr5, Tr11 receive the second clock signal CKVB or the first clock signal CKV through the second clock terminal CK2. The control terminal of the tenth transistor Tr10 receives the first clock signal CKV or the second clock signal CKVB through the first clock terminal CK1. In addition, the Q contact is connected between the eleventh transistor Tr11 and the tenth transistor Tr10 and the output terminal of the first transistor Tr1 of the output unit 513. That is, the gate line is connected between the tenth transistor Tr10 and the fifth transistor Tr5.

A pair of transistors Tr6, Tr9 are coupled in parallel between the Q contact and the low voltage Vss. The control terminal of the sixth transistor Tr6 receives the transfer signal CR of the dummy stage through the reset terminal RE and the control terminal of the ninth transistor Tr9 receives the gate voltage of the next stage through the second input terminal IN2.

A pair of transistors Tr8, Tr13 are connected between the outputs of two transistors Tr7, Tr12 and the low potential level Vss, respectively. The control terminals of the eighth and the thirteenth transistor Tr8, Tr13 are commonly connected to the output terminal of the first transistor Tr1 of the output unit 513, that is, the gate line.

Finally, the pair of transistors Tr2, Tr3 are coupled in parallel between the output of the output unit 513 and the low potential level Vss. The control terminal of the third transistor Tr3 is connected to the output terminal of the seventh transistor Tr7 of the seventh transistor Tr7. The control terminal of the second transistor Tr2 receives the gate voltage of the next stage through the second input terminal IN2.

When the pull-down driver 514 receives the gate voltage of the next stage through the second input terminal IN2, it changes the voltage of the Q contact to the low voltage Vss through the ninth transistor Tr9 and change the voltage output to the gate line through the second transistor Tr2 to the low voltage Vss. In addition, when the transfer signal CR is applied with the transfer signal CR of the dummy stage through the reset terminal RE, the voltage of the Q contact is changed to the low voltage Vss through the sixth transistor Tr6 once more. When the high voltage is applied to the second clock terminal CK2 to which voltage having a phase opposite to the first clock terminal CK1, the voltage output to the gate line through the fifth transistor Tr5 is changed to the low voltage Vss.

As described with regard to FIG. 2, each stage of the main gate driver 500 receives the first and second clock signals CKV, CKVB and the first and second clock terminals CK1, CK2 are alternately input to the first and second clock signals CKV, CKVB for each stage.

The transistors Tr1, Tr13, Tr15 that are formed in the stage SR may be NMOS transistors.

The gate voltage output from the stage SR is transferred through the gate line. The gate line may be represented as having the resistance Rp and the capacitance Cp in a circuit, as shown in FIGS. 2 and 3. These values are included in one gate line but one gate line may have different values according to the structure and characteristics of the display area 300.

The gate line that is extended passing through the display area 300 is connected to the sub gate driver 550 and is connected to the unit sub gate driver 551 in the sub gate driver 550.

The unit sub gate driver 551 includes at least one variable capacitor Csc and the gate voltage discharge transistor Tr14.

The variable capacitor Csc is connected to the capacitance Cp included in the gate line in parallel to increase the capacitance included in the gate line. As a result, the ripple of the gate voltage is reduced, thereby making it possible to prevent noise from generating in the gate voltage. This can be confirmed in Experimental Example described below in conjunction with FIGS. 4A and 4B.

In the gate voltage discharge transistor Tr14 the extending line of the gate line is connected to the input terminal. The extending line of the gate line of the next stage is connected to the control terminal. The output terminal is connected to the low voltage Vss. As a result, when the gate-on voltage is applied to the gate line of the next stage, the gate voltage discharge transistor Tr14 is turned on to discharge the charge existing in the gate line of the current stage, thereby having the low voltage.

Figure 4A:
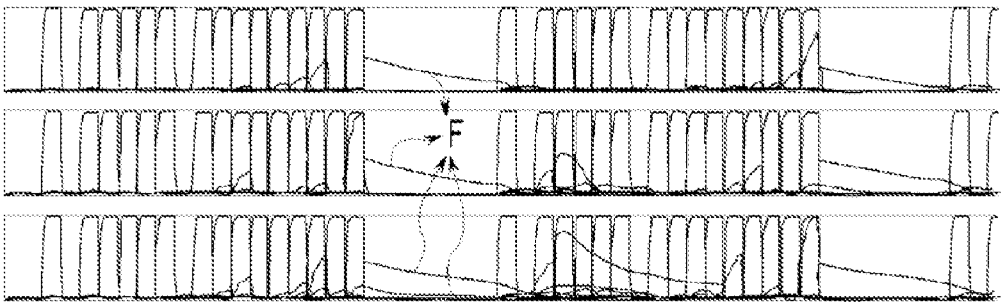
FIG. 4 is a graph showing gate voltage after and before a variable capacitor is added in the gate driver according to an exemplary embodiment of the present invention.
Figure 4B:
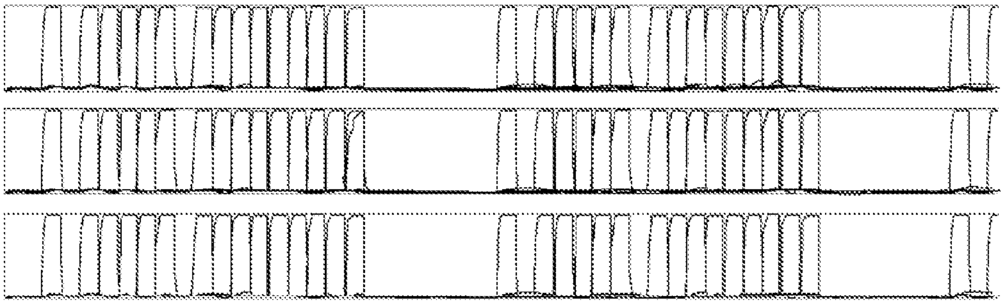

The waveform of the output gate voltage after and before the variable capacitor Csc is used will now be described with reference to FIGS. 4A and 4B which depict graphs showing gate voltage after and before a variable capacitor Csc is added in the gate driver according to an exemplary embodiment of the present invention. More particularly, FIG. 4A shows the case where the variable capacitor Csc does not serve as the capacitor by floating (F) one end of the variable capacitor Csc and shows the case of generating noise while the gate voltage of the main gate driver 500 is operated at the high temperature. FIG. 4B shows the case of operating the main gate driver 500 at high temperature after the entire capacitance value is included in the gate line so that the variable capacitor Csc has the capacitance by applying the predetermined voltage to one end of the variable capacitor Csc. As can be appreciated in FIG. 4B, the ripple of the gate voltage is reduced while increasing the capacitance included in the gate line. As a result, noise does not occur in the gate voltage output from the main gate driver 500 even though the main gate driver 500 is operated at high temperature. In the present exemplary embodiment, the capacitance of the added variable capacitor Csc is 20 pF, but the exemplary embodiment forms the variable capacitor Csc of about 10 to 50 pF, thereby making it possible to remove the occurrence of noise.

As can be appreciated in FIG. 4B, the variable capacitor Csc is added to the rear end of the gate line, thereby making it possible to remove the high temperature noise of the main gate driver 500. The variable capacitor Csc is not necessarily positioned at the rear end of the gate line, but the exemplary embodiment of the present invention shows the case where it is positioned at the rear end of the gate line. This is based upon the fact that the main gate driver 500 is formed at the front end of the gate line to limit the space in which the variable capacitor Csc will be formed. However, according to an exemplary embodiment, when the sufficient space in which the variable capacitor Csc will be formed is secured at the front end of the gate line, the variable capacitor Csc is not necessarily formed at the rear end of the gate line.

FIGS. 5 to 8 are diagrams showing in detail the structure of a sub gate driver in the display panel according to an exemplary embodiment of the present invention.

Figure 5:
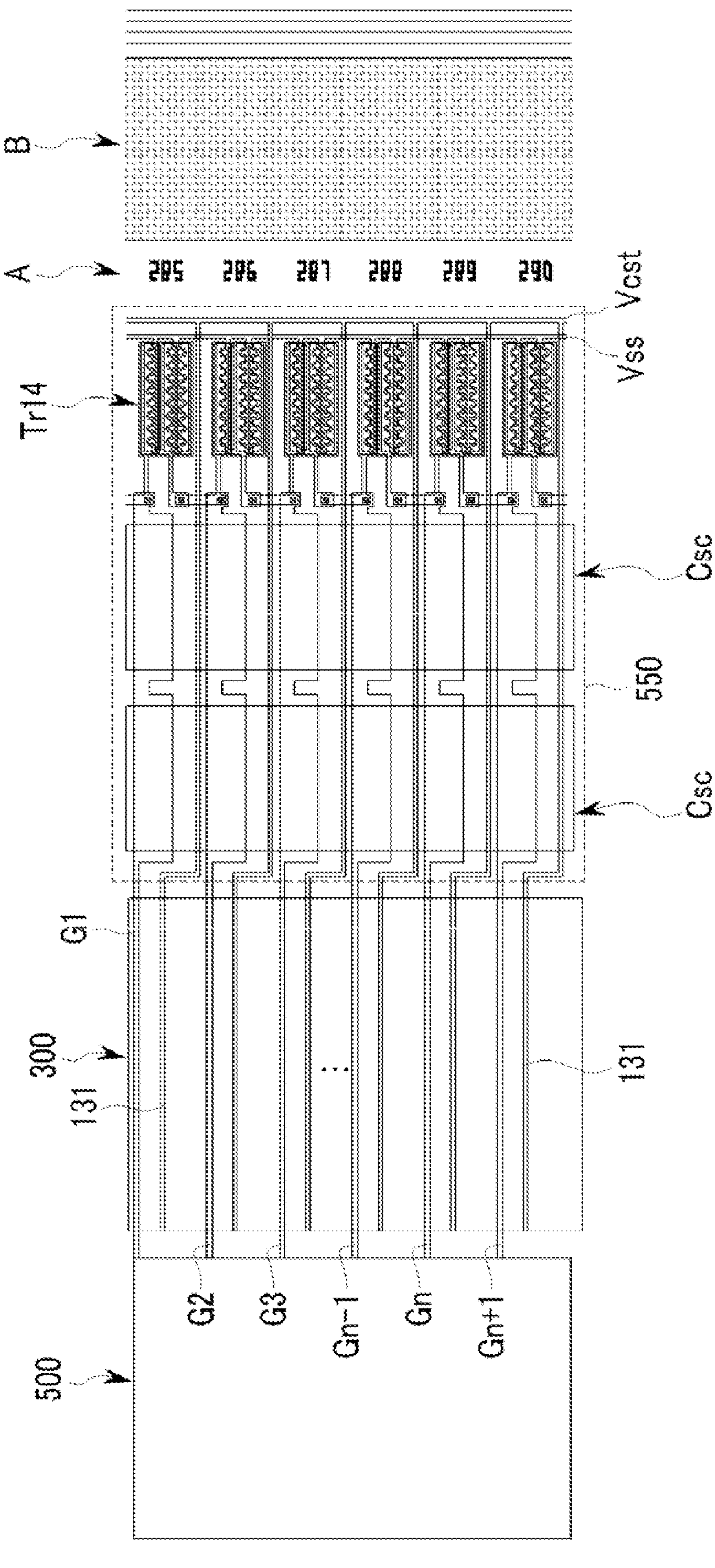
FIGS. 5, 6, 7 and 8 are diagrams showing in more detail the structure of a sub gate driver in the display panel according to an exemplary embodiment of the present invention.
Figure 6:
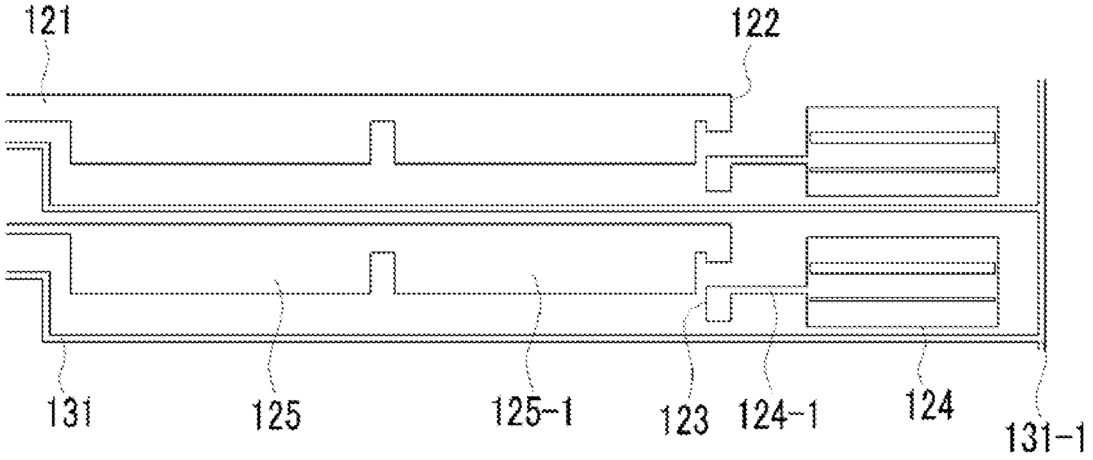
Figure 7:
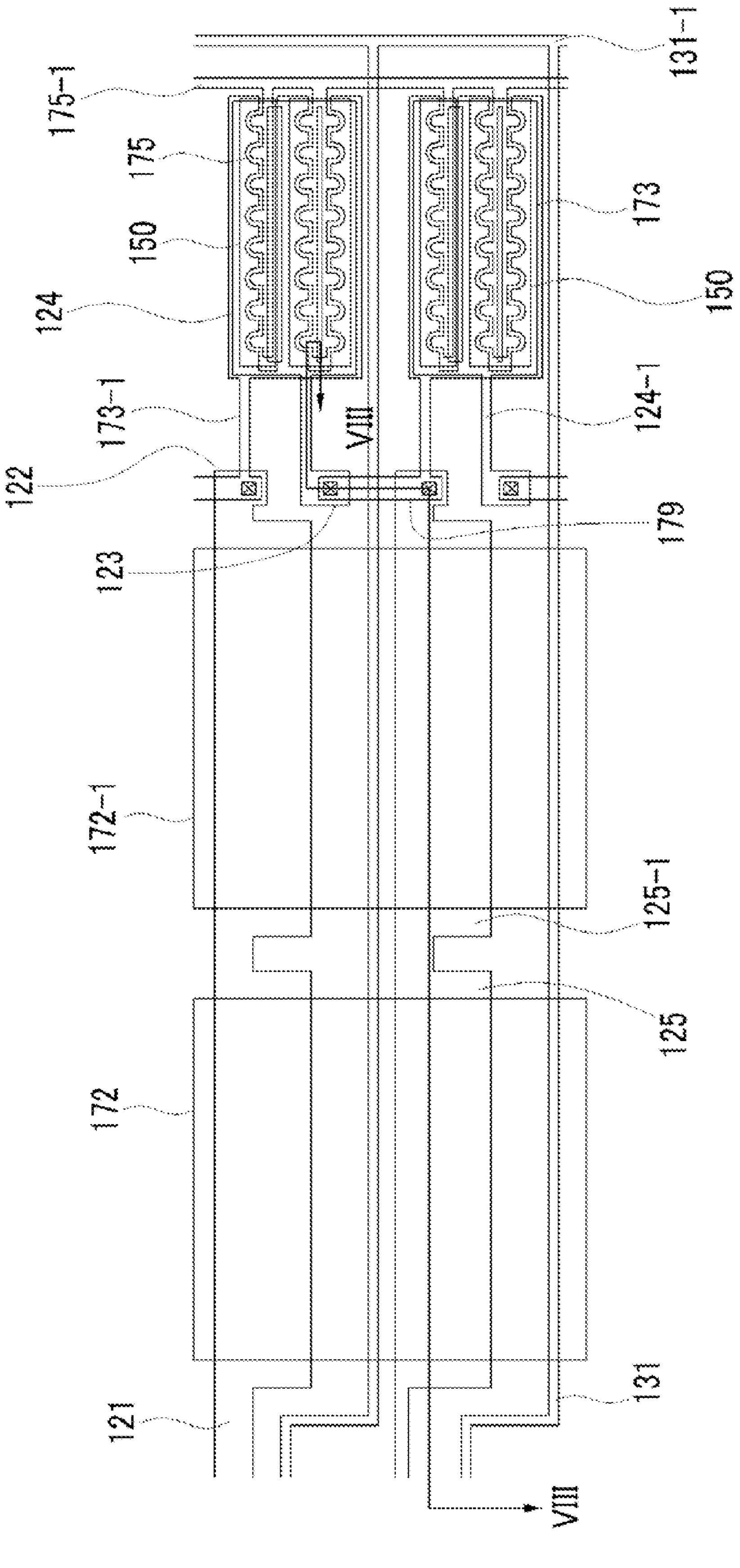
Figure 8:
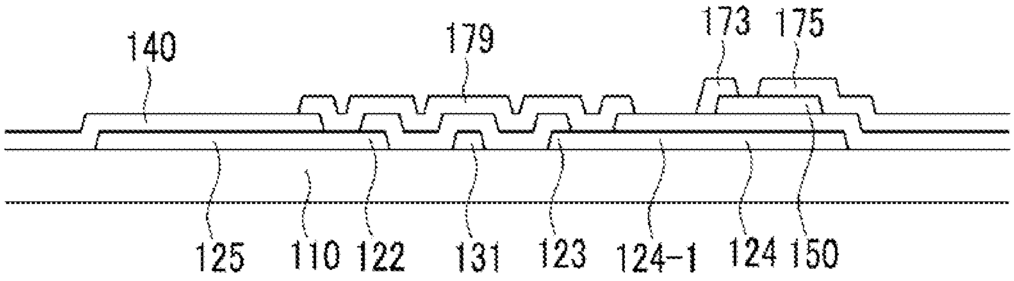

FIG. 5 is a layout view showing a display panel based upon the structure of the sub gate driver 550 according to an exemplary embodiment of the present invention. FIG. 6 is a layout view showing wiring that is formed on the same layer as the gate line in the sub gate driver 550 according to the exemplary embodiment of FIG. 5. FIG. 7 is a diagram showing wiring formed on the same layer as the data line of the exemplary embodiment of FIG. 5. FIG. 8 is a cross-sectional view taken along the line VIII-VIII of FIG. 7.

As shown in FIGS. 5 to 7, the sub gate driver 550 includes the variable capacitor Csc, the gate voltage discharge transistor Tr14, wiring 175-1 that applies the low voltage Vss to the output terminal of the gate voltage discharge transistor Tr14, and wirings 131, 131-1 that apply the maintaining voltage Vcst to the maintaining capacitor Cst.

Referring first to FIG. 5, the right side (outer side) of the sub gate driver 550 is positioned with a region A printed with identification marks and a region B formed with a dummy pattern. The position of the wiring can be easily found in region A by eyesight and as an example of the dummy pattern of region B, there is a cell gap maintaining pattern, dot pattern, or the like.

The structure of the sub gate driver 550 according to an exemplary embodiment of the present invention will now be described in more detail with reference to FIGS. 6 to 8, wherein FIG. 6 shows sub gate driver 550 formed on the same layer as the gate line and FIGS. 7 and 8 show sub gate driver 550 formed on the same layer as the data line.

The sub gate driver 550 is extended from the gate line 121 and has two extended variable capacitor electrodes 125, 125-1 and includes the first extending region 122 formed to contact the upper wiring. The second extending region 123 is also formed to connect to the first extending region 122 of the next stage. The second extending region 123 is extended through the extending line 124-1 that protrudes in the extending direction of the gate line. The gate electrode 124 of the gate voltage discharge transistor Tr14 is formed while one end of the extending line 124-1 gate electrode 124 is extended.

The sub gate driver 550 is also formed with a storage electrode line 131 that applies voltage to the one end of the maintaining capacitor Cst and the storage electrode line 131 is extended to be bent according to the outer side of the variable capacitor electrodes 125, 125-1. In addition, the sub gate driver 550 is formed with a shorting bar 131-1 to be electrically connected to the storage electrode line 131.

A gate insulating layer 140 is formed on the gate line 121, the variable capacitor electrodes 125, 125-1, the first and second extending regions 122, 123, and the gate electrode 124 of the gate voltage discharge transistor Tr14. In particular, a semiconductor layer 150 that forms the channel of the gate voltage discharge transistor Tr14 is formed on the gate insulating layer 140 that is formed on the gate electrode 124 of the gate voltage discharge transistor Tr14.

Electrodes 172, 172-1 of the other end of the variable capacitor are formed on the gate insulating layer 140 to overlap with each of the variable capacitor electrodes 125, 125-1 while extending in the vertical direction to the extending direction of the gate line in the same layer as the data line gate insulating layer 140. The variable capacitor electrodes 125, 125-1, the electrodes 172, 172-1 of the other end of the variable capacitor, and the gate insulating layer 140 therebetween each form the two variable capacitors Csc. When voltage is applied to the electrodes 172, 172-1 of the other end of the variable capacitor, the variable capacitor Csc has the capacitance and when the electrodes 172, 172-1 of the other end of the variable capacitor is floated, the variable capacitor Csc is not operated as the capacitor.

The first extending region 122 of the next stage and the second extending region 123 of the current end are connected to a connecting member 179. As a result, the gate-on voltage of the next stage is applied to the gate electrode 124 of the gate voltage discharge transistor Tr14 of the previous stage.

A source electrode having a plurality of grooves and a drain electrode 175 having a plurality of protruding portions are formed on the gate electrode 124 of the gate voltage discharge transistor Tr14 and on the semiconductor layer 150. The source electrode 173 is electrically connected to the connecting member 179 through the extending line 173-1 protruding from the connecting member of the current end. The drain electrode 175 is extended and is connected to the wiring 175-1 that applies the low voltage Vss. As a result, when the gate-on voltage is applied to the gate line of the next stage, the gate voltage discharge transistor Tr14 of the current end is turned on to discharge voltage from the source electrode 173 to the drain electrode 175, such that the gate line 121 has the low voltage Vss.

In the exemplary embodiment of FIGS. 6 to 8, the drain electrode 175 is configured to have the protruding portion, but in an exemplary embodiment of the present invention, the source electrode 173 can have the protruding portion.

While the present invention has been described in connection with what is presently considered to be practical exemplary embodiments, it is to be understood that the invention is not limited to the disclosed embodiments, but is intended to also cover various modifications and equivalent arrangements, all of which are included within the spirit and scope of the appended claims.

What is claimed is:

1. A display panel, comprising:

a display area that includes a gate line, the gate line having electrical characteristics comprising a gate line resistance and a gate line capacitance;

a main gate driver that is connected to one end of the gate line, that applies a gate on voltage to the gate line, and is integrated on a substrate; and a sub gate driver that is connected to an other end of the gate line and includes at least one variable capacitor, wherein an end of the variable capacitor is connected to the other end of the gate line such that the variable capacitor is in parallel with the capacitance of an adjacent gate line.

2. The display panel of claim 1 wherein an other end of the variable capacitor receives voltage from the outside.

3. The display panel of claim 2, wherein the variable capacitor has a capacitance that varies according to the voltage applied to the other end of the variable capacitor.

4. The display panel of claim 3, wherein the display panel includes more than two variable capacitors connected in parallel.

5. The display panel of claim 3, wherein:

the display area further comprises a data line that intersects the gate line, one electrode of the variable capacitor is made of the same material as the gate line, the other electrode of the variable capacitor is made of the same material as the data line, and a gate insulating layer covers the gate line and is between the one electrode of the variable capacitor and the other electrode of the variable capacitor.

6. The display panel of claim 5, wherein the sub gate driver further comprises a gate voltage discharge transistor that discharges the voltage applied to the gate line.

7. The display panel of claim 6, wherein the gate voltage discharge transistor comprises:

a control electrode that is connected to a gate line of a next stage, an input electrode that is connected to a gate line of a current stage, and an output electrode that is connected to low voltage.

8. The display panel of claim 7, wherein the main gate driver includes a thin film transistor including amorphous silicon.

9. The display panel of claim 8, wherein;

the main gate driver includes an input unit, a pull-up driver, a transmit signal generator, an output unit, and a pull-down driver;

the input unit is responsive to an input voltage and has an output connected to the transfer signal generator, to the pull-down driver and to the output unit;

the pull-up driver is responsive to clock signals and has an output connected to the pull-down driver;

the transfer signal generator is responsive to the clock signals and has an output connected to a next stage for outputting as transfer signal to the next stage;

the output unit is connected to the gate line for providing a gate on voltage and as gate off voltage to the gate line; and the pull-down driver is responsive to a gate voltage of the next stage for changing a gate on voltage output from the output unit to a gate off voltage.

10. The display panel of claim 1, wherein the variable capacitor has a capacitance that varies according to the voltage applied to the other end of the variable capacitor.

11. The display panel of claim 10, wherein the display panel includes more than two variable capacitors connected in parallel.

12. The display panel of claim 10, wherein:

the display area further comprises a data line that intersects the gate line, one electrode of the variable capacitor is made of the same material as the gate line, the other electrode of the variable capacitor is made of the same material as the data line, and a gate insulating layer covers the gate line and is between the one electrode of the variable capacitor and the other electrode of the variable capacitor.

13. The display panel of claim 12, wherein the sub gate driver further comprises a gate voltage discharge transistor that discharges voltage applied to the gate line.

14. The display panel of claim 13, wherein the gate voltage discharge transistor has a control electrode that is connected to a gate line of the next stage, an input electrode that is connected to a gate line of a current stage, and an output electrode that is connected to low voltage.

15. The display panel of claim 14, wherein the main gate driver includes a thin film transistor comprising amorphous.

16. The display panel of claim 15, wherein:

the main gate driver includes an input unit, a pull-up driver, a transmit signal generator, an output unit, and a pull-down driver;

the input unit is responsive to an input voltage and has an output connected to the transfer signal generator, to the pull-down driver and to the output unit;

the pull-up driver is responsive to clock signals and has an output connected to the pull-down driver;

the transfer signal generator is responsive to the clock signals and has an output connected to a next stage for outputting a transfer signal to the next stage;

the output unit is connected to the gate line for providing a gate on voltage and a gate off voltage to the gate line; and the pull-down driver is responsive to a gate voltage of the next stage for changing a gate an voltage output from the output unit to a gate off voltage.

17. The display panel of claim 1, wherein the display panel includes more than two variable capacitors connected in parallel.

18. The display panel of claim 1, wherein:

the display area further comprises a data line that intersects the gate line, one electrode of the variable capacitor is made of the same material as the gate line, the other electrode of the variable capacitor is made of the same material as the data line, and a gate insulating layer that covers the gate line and is between the one electrode of the variable capacitor and the other electrode of the variable capacitor.

19. The display panel of claim 18, wherein the sub gate driver further comprises a gate voltage discharge transistor that discharges voltage applied to the gate line.

20. The display panel of claim 19, wherein the gate voltage discharge transistor comprises:

a control electrode that is connected to a gate line of a next stage, an input electrode that is connected to a gate line of a current stage, and an output electrode that is connected to low voltage.

21. The display panel of claim 20, wherein the main gate driver includes a thin film transistor comprising amorphous silicon.

22. The display panel of claim 21, wherein:

the main gate driver includes an input unit, a pull-up driver, a transmit signal generator, an output unit, and a pull-down driver;

the input unit is responsive to an input voltage and has an output connected to the transfer signal generator, to the pull-down driver and to the output unit;

the pull-up driver is responsive to clock signals and has an output connected to the pull-do driver;

the transfer signal generator is responsive to the clock signals and has an output connected to a next stage for outputting a transfer signal to the next stage;

the output unit is connected to the gate line for providing a gate on voltage and a gate off voltage to the gate line; and the pull-down driver is responsive to a gate voltage of the next stage for changing a gate on voltage output from the output unit to a gate of voltage.

23. The display panel of claim 1, wherein the sub gate driver includes a gate voltage discharge transistor that discharges the voltage applied to the gate line.

24. The display panel of claim 23, wherein the gate voltage discharge transistor has a control electrode that is connected to a gate line of the next stage, an input electrode that is connected to a gate line of a current stage, and an output electrode that is connected to low voltage.

25. The display panel of claim 24, wherein the main gate driver includes a thin film transistor comprising amorphous silicon.

26. The display panel of claim 25, wherein:

the main gate driver includes an input unit, a pull-up driver, a transmit signal generator, an output unit, and a pull-down driver;

the input unit is responsive to an input voltage and has an output connected to the transfer signal generator, to the pull-down driver and to the output unit;

the pull-up driver is responsive to clock signals and has an output connected to the pull-down driver;

the transfer signal generator is responsive to the clock signals and has an output connected to a next stage for outputting a transfer signal to the next stage;

the output unit is connected to the gate line for providing a gate on voltage and a gate off voltage to the gate line; and the pull-down driver is responsive to a gate voltage of the next stage for changing a gate on voltage output from the output unit to a gate off voltage.

27. The display panel of claim 1, wherein the main gate driver includes a thin film transistor comprising amorphous silicon.

28. The display panel of claim 27, wherein:

the main gate driver includes an input unit, a pull-up driver, a transmit signal generator, an output unit, and a pull-down driver;

the input unit is responsive to an input voltage and has an output connected to the transfer signal generator, to the pull-down driver and to the output unit;

the pull-up driver is responsive to clock signals and has an output connected to the pull-down driver;

the transfer signal generator is responsive to the clock signals and has an output connected to a next stage for outputting a transfer signal to the next stage;

the output unit is connected to the gate line for providing a gate on voltage and a gate of voltage to the gate line; and the pull-down driver is responsive to a gate voltage of the next stage for changing a gate on voltage output from the output unit to a gate off voltage.

29. The display panel of claim 1, wherein:

the main gate driver includes an input unit, a pull-up driver, a transmit signal generator, an output unit, and a pull-down driver;

the input unit is responsive to an input voltage and has an output connected to the transfer signal generator, to the pull-down driver and to the output unit;

the pull-up driver is responsive to clock signals and has an output connected to the pull-down driver;

the transfer signal generator is responsive to the clock signals and has an output connected to a next stage for outputting a transfer signal to the next stage;

the output unit is connected to the gate line for providing a gate on voltage and a gate ofr voltage to the gate line; and the pull-down driver is responsive to a gate voltage of the next stage for changing a gate on voltage output from the output unit to a gate off voltage.

* * * * *